United States Patent

[11] 3,600,514

[72] Inventor Dwight J. Poppy
Chicago, Ill.

[21] Appl. No. 17,549
[22] Filed Mar. 9, 1970
[45] Patented Aug. 17, 1971
[73] Assignee Zenith Radio Corporation
Chicago, Ill.

---

[54] SOLID-STATE LUMINANCE CHANNEL FOR COLOR TELEVISION RECEIVER
6 Claims, 1 Drawing Fig.

[52] U.S. Cl. .......... 178/5.4 R, 178/7.3 R
[51] Int. Cl. .......... H04n 9/00, H04n 5/14
[50] Field of Search .......... 178/5.4 R, 5.4 MC, 7.3 R, 7.5 R, 7.3 DC, 7.5 DC

[56] References Cited

UNITED STATES PATENTS

| | | | |
|---|---|---|---|
| 3,499,104 | 3/1970 | Austin .......... | 178/5.4 R |
| 3,510,573 | 5/1970 | Rhodes et al. .......... | 178/5.4 R |

OTHER REFERENCES

" Solid State Makes Debut In Big-Screen Color TV" by Derek Bray in Electronics Vol. 39, No. 8, April 18, 1966 pp. 99— 105 copy in 178-5.4

" Transistor Television Receivers" by T. D. Towers published by J. F. Rider (New York) 1963 pp. 74 & 75 avail. in art unit 233.

*Primary Examiner*—Robert I. Griffin
*Assistant Examiner*—George G. Stellar
*Attorneys*—John J. Pederson and Donald B. Southard

---

ABSTRACT: An improved solid-state luminance channel for a color television receiver having a plurality of interconnected transistor amplifiers wherein contrast and brightness controls are located in respective emitter electrode circuits so that the level of direct current components of the luminance signal remains substantially unaffected with selective settings of such controls. A time delay network is further included having both resistive and reactive termination to enhance the frequency response thereof, particularly at high frequencies. The resistive termination elements for the time delay means effectively serve as the load impedance for the associated transistor amplifier stage.

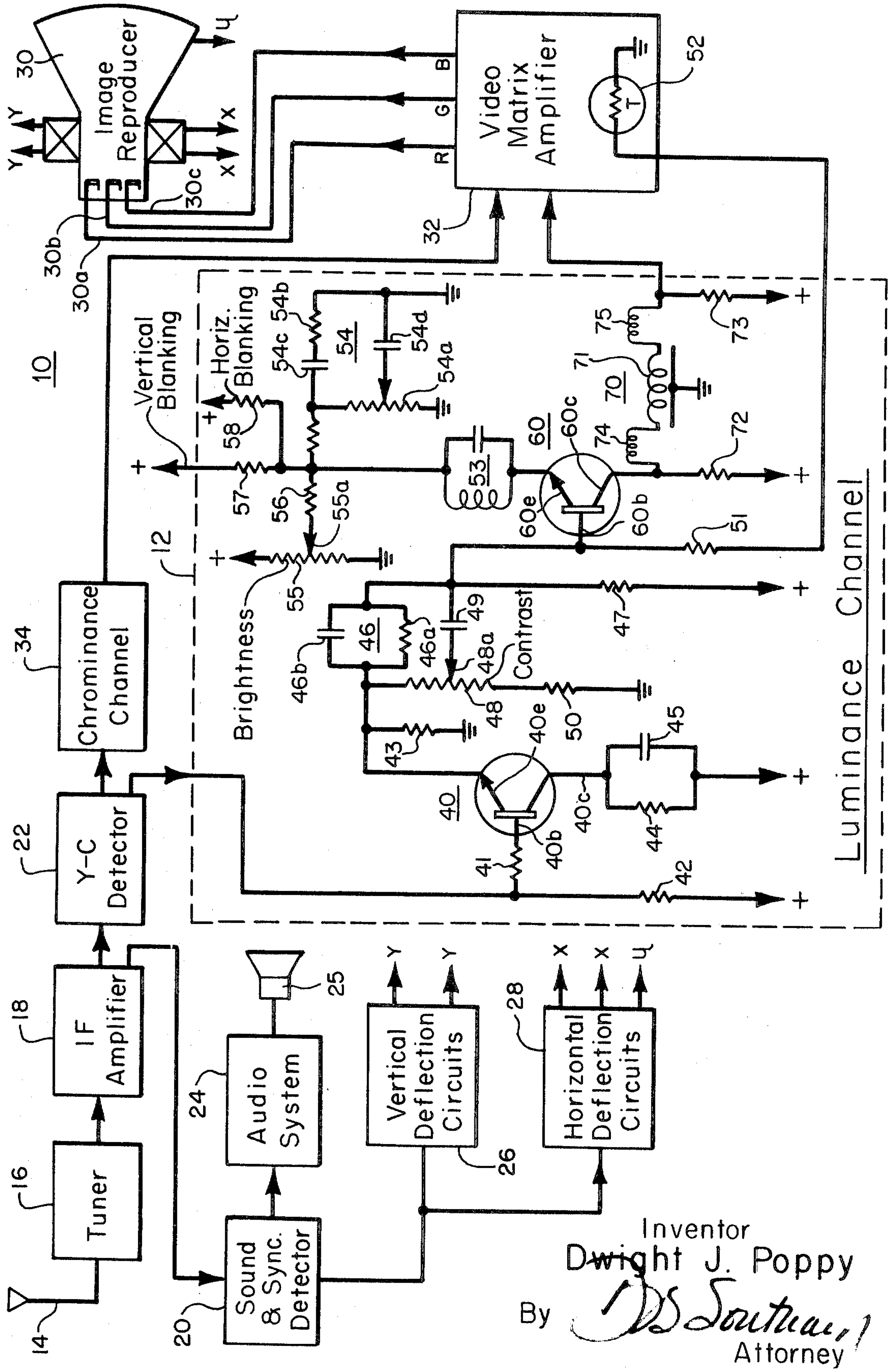
Inventor
Dwight J. Poppy
By [signature]
Attorney

SOLID-STATE LUMINANCE CHANNEL FOR COLOR TELEVISION RECEIVER

BACKGROUND OF THE INVENTION

This invention relates to improvements in television receivers and more particularly to an improved solid-state luminance amplifier channel for a color television receiver wherein the associated contrast and brightness controls are positioned at low impedance points within the channel so as not to affect the level of direct current components in the luminance signal translated therethrough and wherein a delay line is incorporated which includes both resistive and reactive termination for improved response characteristics.

In color television transmission, the transmitted carrier wave is amplitude modulated by a luminance signal to define brightness information in the televised image while the color information is transmitted by a subcarrier which is both phase and amplitude modulated. The luminance signal comprises both alternating current components, representing elemental brightness variations, and direct current components, representing the average brightness in the televised image. For faithful reproduction of the televised image, and particularly in color television receivers, both the alternating and direct current components must be present in the luminance signal as applied to the image reproducer. Accordingly, it is common practice to employ one or more DC coupled amplifiers in the luminance channel whereby both AC and DC components of the luminance signal are processed and applied to the image reproducer, which, together with the applied chrominance signal, produces the correct brightness, hue and saturation for the televised image.

The luminance channel provides a convenient location for the inclusion of the viewer-adjustable contrast and brightness controls in the television receiver. It is also economically attractive because it eliminates separate controls on each of the various cathodes and control grids of the image reproducer. As the same time, however, a problem has been evidenced in the prior art systems in that the level of direct current components of the luminance signal is caused to vary with the setting of the contrast and/or brightness controls. This problem arises whenever such controls are at a location in the circuits of the luminance channel which alters the DC coupling between any of the associated amplifier stages. The problem is particularly acute in receivers employing solid-state devices in the luminance channel because of the generally lower terminal impedances involved as compared with those of electron discharge devices.

Accordingly, it is an object of the present invention to provide an improved solid-state luminance channel for a color television receiver wherein a plurality of transistor amplifier stages are included with associated viewer-adjustable contrast and brightness controls.

A more particular object of the present invention is to provide an improved luminance channel of the foregoing type wherein the settings of the contrast and brightness controls have minimal effect on the magnitude of direct current components in the luminance signal translated therethrough and applied to the image reproducer.

Still another object of the present invention is to provide an improved luminance channel of the foregoing type wherein the contrast and brightness controls are located at low impedance points within the luminance channel circuitry whereby the contrast control varies the ratio of alternating currents to a fixed level of direct current components as applied to the input of a transistor amplifier while the brightness control varies only the quiescent or operating current level of said transistor amplifier.

Still another problem is evidenced in such prior luminance channel circuitry. This problem relates to the required time delay of the signals processed through the luminance channel. Since the chrominance channel has a narrower bandwidth, the signals translated therethrough are delayed to a greater extent than the luminance signals through the luminance channel with a significantly wider bandwidth. Accordingly, it is usual practice to include a time delay network in the luminance channel circuitry so that the luminance signals are delayed by an amount equal to that exhibited for signals translated through the chrominance channel. The delay line or network must be precisely terminated at its respective ends to match the characteristic impedance of the delay line or else reflections are set up within the line causing undesirable "ringing" which appear on the screen as "ghosts" or reoccuring lines. These deficiencies may be attributed to the degradation in response characteristics which occur with respect to the line at the higher frequencies resulting from the action of distributed reactances in the associated circuitry. The problem is emphasized to an even greater extent if a video peaking circuit is incorporated in the circuitry of the luminance channel, as is commonly the case. Such peaking circuit is intended to increase the response, or "boost," the higher frequencies so as to enhance greater detail in the reproduced image. What can be gained in this respect, however, by the use of a video peaking circuit can easily be lost in the degraded response characteristics of the time delay network at these higher frequencies.

Accordingly, it is another object of the present invention to provide an improved luminance channel of the foregoing type wherein a time delay network is included in the output of an associated transistor amplifier stage, which delay line is effectively terminated at respective ends thereof by an impedance network comprising both resistive and reactive elements to improve the response characteristics of the delay network, particularly at the higher frequencies.

Yet another object of the present invention is to provide an improved luminance channel of the foregoing type wherein the resistive elements terminating the delay precisely match its characteristic impedance and additionally serve as the load impedance for the transistor amplifier stage in which the delay network is included.

SUMMARY OF THE INVENTION

In accordance with the present invention, a luminance channel is provided for a color television receiver, which channel includes a plurality of interconnected transistor amplifier stages for processing the luminance signal as applied to the image reproducer. A first transistor amplifier is connected as an emitter follower to the source of luminance signals, such as the luminance/chrominance detector stage. The output of the first transistor amplifier containing both alternating and direct current components comprising the luminance signal is coupled to the input of a second transistor amplifier. An adjustable resistance is interconnected in the emitter circuit of the first transistor amplifier and is coupled to the input of the second transistor amplifier through a coupling capacitor. This adjustable resistance serves as a contrast control and is effective to vary the level of AC components to the second transistor amplifier, and therefore the DC transmission, or ratio of AC to DC components in the luminance signal, but not the actual level or magnitude of DC components which remains at a predetermined, fixed level. A second adjustable resistance is located in the emitter circuit of the second transistor amplifier. This has the advantage of looking into a low impedance point and will have the effect of changing the operating current level of this transistor amplifier stage with minimal or no effect on either the DC transmission or the actual magnitude of DC components translated through the luminance channel.

Additionally, a time delay network is interposed in the output path of the second transistor amplifier at its collector electrode. The time delay network equalized the delay effected for the signals translated through the chrominance channel. The delay network, however, is terminated by resistive elements at its respective ends which precisely match the characteristic impedance of the time delay network and additionally serve as the load impedance for the second transistor amplifier device.

In addition, reactive elements further terminate the respective ends of the time delay network so as to form series resonant circuits in conjunction with the distributed capacitance of the associated circuitry at selected frequencies in the upper range, say at about 3 mHz. and thereby significantly enhance the response characteristics of the luminance channel as a whole. As a result of the improved response at higher frequencies, a 3.58 mHz. trap with attendant sharp attenuation characteristics may be directly inserted in the emitter circuit of the second transistor amplifier without objectionable "ringing" in the time delay line or other undue effects. Further, the desired objectives of a video peaking circuit may be fully realized in enhancing the detail in the reproduced image.

BRIEF DESCRIPTION OF THE DRAWING

The features of the present invention which are believed to be novel are set forth with particularity in the appended claims. The invention itself; however, together with further objects and advantages thereof, may be better understood by reference to the accompanying drawing, in which the single FIGURE is a detailed schematic diagram of a color television receiver having a luminance channel which includes the contrast and brightness controls and also a time delay network in accordance with a preferred embodiment of the present invention.

BRIEF DESCRIPTION OF THE EMBODIMENT

Referring now to the drawing, a color television receiver 10 is shown schematically which incorporates a luminance channel 12 constructed in accordance with the present invention. The receiver includes an antenna 14 coupled to an input tuner stage 16 which amplifies the received signal and converts the same to an intermediate frequency in the well known manner. The amplified and converted signal is coupled to an intermediate frequency amplifier 18 where it is further amplified and then coupled to a sound and sync detector 20, and also a luminance (Y) and chrominance (C) detector 22. Sound and sync detector 20 in turn connects to an audio system 24 having appropriate detection circuitry and a loudspeaker 25 for reproducing the audio portion of the received signal.

Sound and sync detector 20 further connects to vertical deflection circuitry 26 and also to horizontal deflection circuitry 28, the latter also including the usual high voltage supply for the second anode of the picture tube, identified at U, in the image reproducer 30. Appropriate scanning signals are developed in the vertical and horizontal deflection stages 26 and 28 which, upon application to appropriate deflection yokes positioned about the image reproducer 30, reproduce the televised image in the conventional manner. The image reproducer 30 may be a conventional shadow mask picture tube comprising a tricolor image screen or target (not shown) to be selectively scanned by a group of three electron beams developed by individual guns within the tube, the cathodes of which are represented at **30*a*, 30*b* and 30*c*. The three cathodes are connected to a video matrix amplifier network 32 from which the various chrominance and luminance information is processed and applied thereto. In the embodiment of the receiver as herein shown, the color signals, indicated R, G and B, are applied directly to the cathodes 30*a*, 30*b* and 30*c*, respectively. It should be understood, however, that other systems are equally compatible, such as those receivers designed to utilize color difference signals. In the latter, the luminance (Y) signal is generated and applied directly to the three cathodes in common, with the color difference signals (R–Y, G–Y and B–Y) being selectively applied to the associated first control grids (not shown) of the picture tube 30**. The type of chroma processing is not directly related to the subject matter of the present invention and is in no way critical to its operation.

The luminance/chrominance detector 22 is connected to a chrominance channel 34 for developing the chrominance signals which are applied to the video matrix 32 as one of the informational inputs thereto. Detector 22 is likewise connected to the luminance channel 12 wherein the luminance signals are processed and applied to the video matrix network 32, forming the other of its informational inputs. Appropriate matrixing occurs within stage 32 such that signals containing the correct brightness, hue and color saturation information are obtained and applied to the appropriate control electrodes of the picture tube 30 in the manner well understood in the art.

As thus far described, the receiver is entirely conventional in general construction and operation such that further and more particular operational description should not be necessary. More particular consideration, however, will be given to that portion of the receiver 10 which constitutes the luminance channel 12 embodying the principles of the present invention.

As mentioned previously, the luminance channel of a color television receiver is intended to process the luminance or brightness information of the televised signal which, upon combining with the chrominance information at or before the image reproducer, recreates the correct color, hue and brightness aspects of the reproduced image. The luminance (Y) signal encompasses both alternating current AC components, representing the elemental brightness variations, as well as direct current DC components, representing the average brightness level in the scene. Both are important in the final resolution of the reproduced image. Moreover, it is also important to maintain the magnitude of DC components at some predetermined, but substantially fixed level within the luminance channel, and consequently as applied to the appropriate control electrodes of the picture tube, else undesirable color rendition of a washed-out appearance may result on low DC transmission levels, i.e., a relatively high AC to DC ratio in the luminance signal, and, on the other hand, blooming or defocusing that may occur on excessive DC transmission levels.

In the luminance channel 12 illustrated in the drawing, a plurality of interconnected video transistor amplifier stages are provided, such as those indicated generally at 40 and 60. The number of video amplifier stages, however, is in no way critical. The first transistor amplifier 40 is connected as an emitter follower to the output of the Y–C detector stage 22 so as to present a high impedance to the detector stage while at the same time presenting a relatively low impedance to the input of transistor amplifier 60. A resistor 41 connected in series with the base electrode **40*b* provides parasitic suppression while a resistor 42 connected from the end of resistor 41 remote from base electrode 40*b* and a source of unidirectional potential provides the operating bias for the transistor amplifier 40. Resistor 43 functions as the emitter load impedance while a resistor 44 serves as the collector load which is suitably bypassed by a capacitor 45**.

The output of transistor amplifier 40 at its emitter electrode is coupled to the input of the second transistor amplifier 60 through two separate signal conduction paths. The first path includes an RC coupling network 46 comprising resistor **46*a* and a capacitor 46*b* connected in parallel between the transistor emitter electrode 40*e* and the base electrode 60*b* comprising the input to transistor amplifier 60. A resistor 47 connected between base electrode 60*b* and the source of unidirectional potential provides operating bias for the transistor amplifier 60 and also completes a voltage divider network in conjunction with RC network 46. Accordingly, RC network 46 in combination with the resistance 47 determines the level of DC components of the luminance signal as applied to the input of the transistor amplifier 60**, which level is intended to remain substantially fixed and unvarying.

A second signal path is presented between transistor stages 40 and 60 by a selectable portion of adjustable resistance or potentiometer 48 and coupling capacitor 49. As illustrated, potentiometer 48 is connected between a junction common to transistor emitter electrode **40*e* and ground through a limiting resistor 50. The adjustable slider arm 48*a* of potentiometer 48** is coupled to the input of transistor amplifier 60 through the coupling capacitor 49.

As will be readily understood, the setting of the potentiometer 48 determines the magnitude or level of AC components of the luminance signal applied to the input or base electrode of transistor amplifier 60, but is ineffective to alter the magnitude of DC components coupled thereto through the RC network 46. Potentiometer 48 is seen to vary only the ratio of AC to fixed DC component, such ratio defining the DC transmission level, commonly used as a term of art. Accordingly, potentiometer 48 effectively serves as a contrast control. It is located at a low impedance point in the luminance channel circuitry so as to produce minimal effect on the other operational parameters of the luminance channel.

Forward bias for the transistor amplifier 60 is provided by the resistor 47 connected between its base electrode *60b* and the source of unidirectional potential. Such bias is further controlled, however, by the action of an additional resistor 51 in its base electrode circuit and returned to ground through a resistance element 52 having a negative temperature coefficient, commonly referred to as a thermistor, the function of which will be explained subsequently. The output of transistor amplifier 60 is taken at its collector electrode *60c*. A 3.58 mHz. trap circuit 53 is interposed in the emitter circuit of the transistor amplifier 60, to block or effectively reduce translation of any chrominance information, and, also a video peaking circuit arrangement, indicated generally at 54. Additionally, an adjustable resistance or potentiometer 55 is likewise interconnected in the emitter circuit of amplifier 60 as shown and which serves as an adjustable brightness control. The video peaking circuit 54 comprises a series-parallel arrangement of resistance elements *54a* and *54b* and capacitors *54c* and *54d* interconnected in the manner illustrated. Peaking circuit 54 operates in a known manner to boost or emphasize the high frequencies present in the luminance signal processed through channel 12. The result is greater or finer detail in the reproduced image.

As indicated, potentiometer 55 is connected between ground and a source of unidirectional potential, with its adjustable slider arm *55a* being coupled through a series limiting resistor 56 and the trap 53 to the emitter electrode *60e*. It is to be noted that suitable blanking of the transistor amplifier stage 60 during retrace intervals is effected through associated resistors 57 and 58, also connected to the emitter electrode *60e*through trap 53. Vertical blanking signals are transmitted thereto through resistor 57 and suitable horizontal blanking signals are transmitted through resistor 58. As will be understood, the brightness control represented by potentiometer 55, in being located in the emitter circuit of transistor amplifier 60, is at a low impedance point. Moreover, it is effectively isolated from the coupling network applying the respective components of the luminance signal at the input of the associated transistor amplifier. Accordingly, the setting of the potentiometer 55 will have little if any effect on the operational parameters of the transistor amplifier 60 other than the desired ability to shift the DC operating level thereof, or quiescent point. The magnitude or fixed level of DC components coupled to the input of the amplifier stage means unchanged notwithstanding changes in the setting of potentiometer, or brightness control, 55. Nor is the DC transmission level as previously defined appreciably altered in any way be the selected setting of the brightness control 55.

The final operational aspect of the luminance channel 12 resides in the provision of a time delay network as shown generally at 70. The delay network 70 is interposed in the output of amplifier 60 at its collector electrode *60c*. As previously mentioned, the purpose of the delay network 70 is to effect an appropriate delay in the luminance signals translated therethrough so as to equal that imposed on signals processed through the chrominance channel 34.

In addition to effecting the required time delay for luminance signals through channel 12, the delay network used must avoid undue degradation of the response characteristics of the luminance channel as a whole. Such degradation may arise because of improper impedance matching and/or restrictions imposed on the translation therethrough of the higher frequency components of the luminance signal. When such condition obtains, objectionable "ringing" develops which represents reflections of signal energy traveling back up the delay line and, if a further mismatch is present at its forward or input terminal, traveling back down the line at a time and phase difference with respect to the principal luminance signal energy. Such undesirable reflections are evidenced in the reproduced image of ghosts or series of lines about the profile of an object on the picture tube screen. The problem of "ringing" is emphasized to even a greater extent where a filter or other coupling network exhibiting sharp cutoff characteristics is included in close circuit coupling relation, such as for example the 3.58 mHz. trap circuit in the emitter circuit of amplifier 60.

Accordingly, the operation of the delay network 70 in the present invention is optimized by the inclusion of a delay line 71 having resistive elements 72 and 73 terminating the respective ends thereof which precisely match the characteristic impedance of the delay line 71. Resistors 72 and 73 are connected to a source of unidirectional potential and collectively serve as the load impedance of the transistor amplifier 60. In addition to the resistive termination, delay network 70 further includes reactive termination comprising inductances 74 and 75 connected in series with the respective ends of delay line 71. Inductances 74 and 75 are of selected values such that series resonant circuits are formed in conjunction with the distributed capacitance of the associated luminance channel circuitry. A portion of the distributed capacitance may be attributed to the interelectrode capacitance between base and collector and between emitter and collector of transistor amplifier 60. Another portion may arise from the physical configuration of resistors 72 and 73. In any event, the series resonance is selected to occur at some reference frequency in the upper range of response characteristic of channel 12, say, at about 3 mHz. As a result, effective impedance matching is obtained for all signal frequencies generated and translated through luminance channel 12 and in turn passed through the time delay network 70. The practical benefits are improved quality in the reproduced image and the full potential of the associated video peaking circuit 54 is realized with respect to boosting or emphasizing the high frequency components in the processed luminance signal.

It is to be understood that additional video amplifier stages may be incorporated in the luminance channel embodying the present invention if so desired. If, for example, a third transistor video amplifier is to be utilized, it may be suitably interposed between the output of the delay network 70 and the input to the video matrix stage 32. In this instance, the value of inductance 75 may require some adjustment to account for a potential change in distributed capacitance but in any event will be obvious to one skilled in the art.

The thermistor 52 is included in the base circuit of transistor amplifier 60 to compensate for variations in gain characteristics of the various video amplification devices during warmup time. A slight increase in current level is effected through such transistor amplifier devices after a given warmup time, on the order of 10 or 15 minutes. The increase in current is reflected as a slight increase in the average brightness level. The thermistor 52 in the base circuit of transistor amplifier 60 decreases in resistance at the elevated operating temperatures, thereby slightly reducing the bias applied to amplifier 60 and in turn decreasing the brightness level accordingly. Thermistor 52 is indicated as being physically located at the video matrix stage 32 because it is the final operating temperature of the associated transistor amplifier or amplifiers therein which is the most significant. The actual location of thermistor 52, however, is in no way critical and may well be mounted at other locations within the receiver.

While only one specific embodiment of the invention is shown and described herein, it will, of course, be readily understood that other variations and modifications may be effected without departing from the true spirit and scope of the present invention. The appended claims are intended to cover all such modifications and alternative constructions that fall within such true scope and spirit.

I claim:

1. In a television receiver for reproducing televised images and having a chrominance channel which introduces a time delay in signals transmitted therethrough, an improved solid-state DC coupled luminance amplifier channel, comprising in combination:

a source of luminance signals;

at least two solid-state amplifier stages, each including a transistor amplifier having input, emitter and collector electrodes, the first amplifier stage being coupled to said source of luminance signals and operative as an emitter follower;

coupling means interconnecting said amplifier stages for passing therethrough a predetermined amount of alternating and direct current components of the amplified luminance signal;

first adjustable resistance means connected from the emitter electrode of said first transistor amplifier and a reference point and coupled to the input of said second transistor amplifier and operative to adjust the ratio of alternating current to a fixed level of direct current components of the luminance signal supplied to the second transistor amplifier for effecting contrast control of the reproduced image;

a source of unidirectional potential;

second adjustable resistance means connected from said source of unidirectional potential and said reference point and coupled to the emitter electrode of said second transistor amplifier, said second adjustable resistance means being adjustable over a predetermined range for effectively controlling the brightness of the reproduced image and being substantially ineffective to alter the amount of direct current components of the luminance signal coupled to the input of said second transistor amplifier; and time delay means interposed in the output path of said second transistor amplifier at the collector electrode for effecting a time delay equal to that exhibited in the chrominance channel, said time delay means including substantially resistive elements terminating respective ends thereof which match the characteristic impedance of said delay means and additionally serve as the load impedance for said second transistor amplifier, said time delay means being further terminated at respective ends thereof by substantially inductive elements which in conjunction with the distributed luminance channel circuit capacitance provides series resonant circuits at selected frequencies to enhance the high frequency response of said time delay means.

2. A luminance amplifier channel for a color television receiver in accordance with claim 1 wherein the coupling means interconnecting respective amplifier stages includes a resistor and capacitor connected in parallel between the emitter electrode of said first transistor amplifier and the input electrode of said second transistor amplifier and a further resistor connected between said second transistor amplifier input electrode and the source of unidirectional potential, thereby forming a fixed voltage divider network effective to apply a predetermined level of direct current luminance signal components to said second transistor amplifier.

3. A luminance amplifier channel for a color television receiver in accordance with claim 1 wherein additional resistance means are connected between said second transistor input electrode and a reference point, said additional resistance means including at least a portion thereof having a negative temperature coefficient characteristic of a value to effectively reduce the bias on said second transistor amplifier to a level to compensate for any increase in brightness level otherwise resulting from higher current levels inherent in such transistor amplifiers operating at elevated temperatures.

4. A luminance amplifier channel for a color television receiver in accordance with claim 1 wherein said second adjustable resistance means is effective to shift the direct current operating level of said second transistor amplifier and being substantially ineffective to vary the level of direct current luminance signal components applied to the input of said second transistor amplifier as well as the ratio of alternating current components to direct current components, in the luminance signal translated through said second transistor amplifier.

5. A luminance amplifier channel for a color television receiver in accordance with claim 1 wherein said first and second amplifier stages include junction transistors of the NPN type.

6. A luminance amplifier channel for a color television receiver in accordance with claim 1 wherein said substantially inductive elements terminating respective ends of said delay line have selected values which in combination with said distributed circuit capacitance effect series resonant circuits at approximately 3 mHz.